US009445387B2

(12) United States Patent
Han (10) Patent No.: US 9,445,387 B2
(45) Date of Patent: Sep. 13, 2016

(54) METHOD AND APPARATUS FOR BUILDING WI-FI RADIO MAP (71) Applicant: Korea Advanced Institute of Science and Technology, Daejeon (KR)

(72) Inventor: Dong-soo Han, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 46 days.

(21) Appl. No.: 14/117,025

(22) PCT Filed: Dec. 3, 2012

(86) PCT No.: PCT/KR2012/010377
§ 371 (c)(1),
(2) Date: Nov. 11, 2013

(87) PCT Pub. No.: WO2013/180362
PCT Pub. Date: Dec. 5, 2013

(65) Prior Publication Data
US 2014/0341198 A1   Nov. 20, 2014

(30) Foreign Application Priority Data

Jun. 1, 2012 (KR) .................. 10-2012-0058959

(51) Int. Cl.
*H04W 64/00* (2009.01)
*G01S 5/02* (2010.01)
(Continued)

(52) U.S. Cl.
CPC ............ *H04W 64/00* (2013.01); *G01S 5/0242* (2013.01); *G01S 5/0252* (2013.01); *H04W 8/005* (2013.01); *H04W 8/26* (2013.01);

*H04W 16/18* (2013.01); *H04W 64/003* (2013.01); *H04W 84/12* (2013.01)

(58) Field of Classification Search
USPC ........................................... 370/338
See application file for complete search history.

(56) References Cited

U.S. PATENT DOCUMENTS

2008/0176583 A1* 7/2008 Brachet ............... G01S 5/0236
  455/456.3
2011/0207470 A1* 8/2011 Meredith ............ G01S 5/0252
  455/456.1

(Continued)

FOREIGN PATENT DOCUMENTS

JP   2002-223218 A   8/2002
JP   2011-509028 A   3/2011

(Continued)

Primary Examiner — Charles C Jiang
Assistant Examiner — Kyaw Z Soe
(74) Attorney, Agent, or Firm — Chanmin Park (57) ABSTRACT The present invention is related to method and device for building Wi-Fi radio map. Especially, it is related to device and method for building Wi-Fi radio map that is used to position locating service that utilizes Wi-Fi fingerprints that many, unspecified mobile terminals collect and provide. Specifically, the present invention provides, as methods for estimating position data for AP (200) using Wi-Fi fingerprints collected by mobile terminals (100), 1) method for estimating position data for AP (200) by linking Wi-Fi fingerprints and time data for collecting Wi-Fi signal, or 2) method for estimating position data for AP (200) through user address data comparison between Wi-Fi fingerprints without linking signal collection time data to Wi-Fi fingerprints. Accordingly, it has effects of epoch-making economic feasibility compared to prior art that requires huge cost in collecting Wi-Fi fingerprint like war driving.

12 Claims, 5 Drawing Sheets (51) Int. Cl.
*H04W 8/00* (2009.01)
*H04W 8/26* (2009.01)
*H04W 84/12* (2009.01)
*H04W 16/18* (2009.01)

(56) References Cited

U.S. PATENT DOCUMENTS

| | | | |
|---|---|---|---|
| 2011/0274000 A1 | 11/2011 | King et al. | |
| 2012/0072106 A1* | 3/2012 | Han | G01C 21/206 |
| | | | 701/410 |
| 2012/0170560 A1* | 7/2012 | Han | G01S 5/0252 |
| | | | 370/338 |
| 2014/0289821 A1* | 9/2014 | Wilson | G06Q 20/42 |
| | | | 726/5 |

FOREIGN PATENT DOCUMENTS

| | | |
|---|---|---|
| KR | 1020110012019 | 2/2011 |
| KR | 1020110026229 | 3/2011 |
| KR | 1020110096476 | 8/2011 |
| KR | 101091804 | 12/2011 |
| KR | 1020110137068 | 12/2011 |
| KR | 101144016 | 5/2012 |
| WO | WO-2011-045425 A1 | 4/2011 |

* cited by examiner

Fig. 6

METHOD AND APPARATUS FOR BUILDING WI-FI RADIO MAP

FIELD OF TECHNOLOGY

The present invention is related to method and apparatus for building Wi-Fi Radio map, and specifically to method and apparatus for building Wi-Fi radio map for use in position locating service, which utilizes Wi-Fi fingerprints that are collected and provided by many unspecified mobile terminals. Here, Wi-Fi fingerprint is a list (or set) of signal pair that includes received signal strength indicator (RSSI) of Wi-Fi repeater (hereinafter, "AP") transmission signal and AP's unique data (BSSID), which are obtained when a mobile terminal scans Wi-Fi signal. The list is abbreviated "Wi-Fi fingerprint," hereinafter.

BACKGROUND TECHNOLOGY

While, position locating method using GPS (Global Positioning System) is used in various technical fields and application fields, the use has a limit because accuracy of signal received from satellites are low depending on locations. Especially, GPS signal cannot be received in the interior and there is limit for application to interior position data locating service that is in spotlight recently.

Recently, due to rapid expansion of WLAN infrastructure, services that locate positions using Wi-Fi signal, which is transmission signal of WLAN AP, and without using GPS signal. That is, in the position locating service using Wi-Fi signal, a service provider obtains Wi-Fi fingerprint based on Wi-Fi signal that is transmitted from WLAN AP's that are fixedly installed indoors or outdoors, a Wi-Fi radio map database is built by linking coordinates of corresponding points to the obtained Wi-Fi fingerprints, and a service environment for locating positions is provided. Then, when a service subscriber receives Wi-Fi signal at an arbitrary point, he can locate the position of the desired point referring to the Wi-Fi radio map database.

The biggest issue to provide such service that enables locating positions using Wi-Fi signal is how to build a reliable Wi-Fi signal map.

As prior art for building Wi-Fi signal map, the building technology by Skyhook company is known. This technology collects a pair of GPS signal and Wi-Fi fingerprint that includes AP unique data through war driving, estimates AP position using the accumulated data, builds an Wi-Fi signal map based on the estimated AP position data, and uses this in the position location service. This method, known as 'WPS,' has disadvantages that it requires a lot of cost and time, but still the accuracy is not high as the average error distance is almost 40 m. Also, because it collects Wi-Fi fingerprint while moving with a vehicle, it has clear limit in collecting Wi-Fi fingerprint for AP's installed indoors.

This Applicant suggested a method for effectively securing AP position data through Korean Patent No. 10-1091804 ("KR 804 Patent," hereinafter) that was filed as a patent application on Dec. 15, 2009, and registered on Dec. 2, 2011. The technology disclosed in 'KR804' Patent is a method for utilizing active participation of service users. When an arbitrary mobile terminal collects Wi-Fi fingerprint, it requests the user who carries the mobile terminal to input location data. When the user inputs the location data, the mobile terminal stores the location data input that it received and Wi-Fi footprint together, and then transmits them to a service provider. The service provider can use them to build Wi-Fi signal map, and estimate the location data of AP more accurately.

However, such method requires active participation of users who carry mobile terminals as prerequisite. Because most users respond very passively in inputting location data, there is a problem of low effectiveness. Also, because the location data input by users is symbolic data, there is limit that absolute position coordinates are not obtained.

Upon identifying the limit of securing AP position data by user participation, this Applicant suggested a new method for effectively securing AP position data through Korean Patent No. 10-1144016 ("KR 016 Patent," hereinafter) that was filed as a patent application on Jul. 20, 2010, and registered on May 2, 2012. The technology disclosed in 'KR106' Patent is a method that collects position data and Wi-Fi fingerprint of AP using house appliances that are installed at fixed indoor positions and connected to the Internet. That is, under a premise that house appliances connected to the Internet (TV, set top box, refrigerator, etc.) include installed modules that collect Wi-Fi fingerprints and transmit them to a remote server that are preset, and the location data for corresponding appliances can be obtained from the businesses which installed the appliances, each appliance is controlled to collect Wi-Fi fingerprints periodically and to transmit them to a remote server for building Wi-Fi signal map, and the remote server refers to appliance-unique data from signals received from the appliances, links them to pre-obtained data for installation locations of the appliances, and builds the Wi-Fi signal map.

However, there is a problem that it takes long time before realizing mass distribution of appliances on which Wi-Fi fingerprint collecting modules are installed, and have functions to transmit Wi-Fi fingerprints to the remote server.

The present invention solves those problems of the above prior arts, and proposes a new method that has little difficulty in performing the function of collecting Wi-Fi fingerprints, and collects Wi-Fi fingerprints using mobile terminals, the spreading of which has been increasing explosively recently, especially, smart phones. On the other hand, the method proposed by the present invention has effects that are distinct from prior art because, unlike 'KR 804 Patent,' in which location data that are directly input with mobile terminals by users who actively participate are used, it uses Wi-Fi fingerprints collected with mobile terminals, while the user is unconscious of the situation, and enables building a Wi-Fi signal map.

DETAILED DESCRIPTION OF INVENTION

Technical Tasks

Accordingly, the objective of the present invention is to provide a device and method that use address data of user (mobile terminal owner) regarding Wi-Fi fingerprints that many mobile terminals collect and send, estimates positions at which said Wi-Fi fingerprints were collected, and builds a Wi-Fi radio map.

Means to Solve Tasks

In order to achieve the above objective, the present invention is characterized in that it includes a user address database that stores address data for many users who carry mobile terminals, and stores at least one address per said user; and a controller that receives Wi-Fi fingerprints, which are collected and transmitted by the mobile terminals carried by said many users, refers to the user address database for each of the received Wi-Fi fingerprints, chooses one address among the addresses of the user who carried the mobile terminal that collected the Wi-Fi fingerprint, converts the chosen address of the user to coordinates, and then generates Wi-Fi radio map data.

Effects of Invention

Because, when many mobile terminals collect the Wi-Fi fingerprints and transmit them, the present invention does not need location data input action through user's conscious device operation, it can maximize effectiveness of collecting Wi-Fi fingerprints through mobile terminals.

In addition, because, for the collected Wi-Fi fingerprint, it can estimate the position at which said Wi-Fi fingerprint was collected using residence (house) address and work place (office) address of the user that were secured in advance, it has effects of epoch-making economic feasibility compared to prior art that requires huge cost in collecting Wi-Fi fingerprint like war driving.

EMBODIMENTS OF INVENTION

A device and method for building Wi-Fi radio map according to the present invention requires a prerequisite that a plurality of mobile terminals are supported with a function that they can collect Wi-Fi fingerprints through receiving surrounding Wi-Fi signals while users are unconscious of it or it is unobtrusive to users, and that they transmit the fingerprints together with their unique data (PIN) to a pre-set remote server.

For this, a method, in which a Wi-Fi fingerprint collection module can be embedded as a form of daemon in the operating system of a mobile terminal (Android OS, iphone OS), or it can be embedded in an utility program distributed by communication business operator to perform functions of collecting and transmitting Wi-Fi fingerprints, can be applied. In addition, it is possible to embed an Wi-Fi fingerprint collection module in a widely spread game, application program for transmitting messages, or application programs, such as position logging or checking positions of lost devices, for which Wi-Fi fingerprint collection and transmission functions are essential.

Also, the present invention requires a prerequisite that an address database for users, who carry mobile terminals that collect and transmit Wi-Fi fingerprints to estimate position at which the received Wi-Fi fingerprint is collected, is secured in advance.

At said user address DB, residence (house) address as the main activity area, workplace (office) address data, and data unique to the mobile terminal being carried per user are stored and managed. For the workplace address, it may be address of a building and suite number for an office worker. For a student, it may be address of a laboratory that she belongs to including a building number and room number. For a merchant, it can be store address, etc. for figuring out the location. For jobless people who do not have economic activity, the address for workplace may not be stored or managed. Accordingly, at said user address DB, address data for users who are mobile terminal owners are stored and managed. At minimum, addresses for main activity area including residence (house) address are stored and managed.

Embodiments of the present invention are explained in detail below referring attached drawings.

Figure 1:
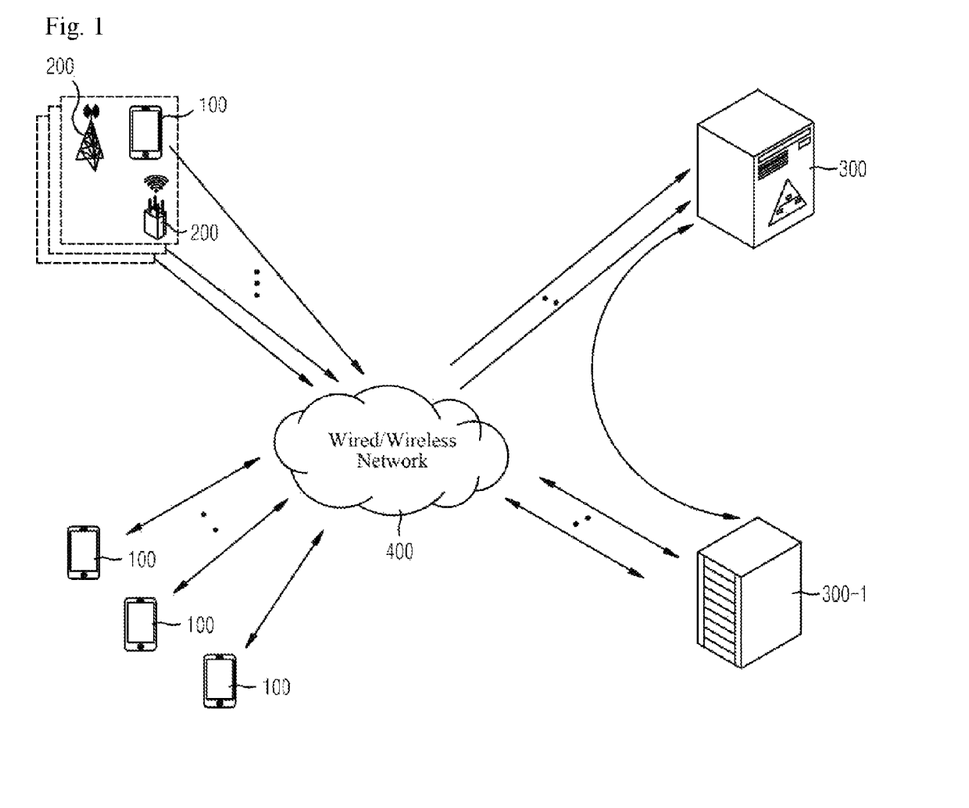
FIG. 1 is an entire structural diagram of a system for building Wi-Fi radio map.

FIG. 1 is an entire structural diagram of a system for building Wi-Fi radio map.

A plurality of mobile terminals (100) collect Wi-Fi fingerprints transmitted by surrounding AP's (200) occasionally or at pre-determined interval, combine their own (100) unique data (PIN), and then transmit them to Wi-Fi radio map building devices (300, 300-1), which are positioned remotely, through an wireless network (400). At the Wi-Fi radio map building devices (300, 300-1) of the present invention, when they receive the Wi-Fi fingerprints combined with the mobile terminal's unique data (PIN) transmitted by said mobile terminals (100), they find the user who carry the corresponding mobile terminal using the mobile terminal's unique data (PIN). Then, they decide address that is estimated to be the place at which the Wi-Fi fingerprint is collected using the address data (residence, workplace) of the user found, perform work of converting the decided address into coordinates, generate a Wi-Fi radio map combined with the coordinates, and build DB by gathering these.

Specifically, as a method for estimating collection position of the Wi-Fi fingerprints collected by the mobile terminals (100), the present invention provides 1) method for estimating collection position data for Wi-Fi fingerprints by linking Wi-Fi fingerprints and time data for Wi-Fi signal collection, or 2) method for estimating collection position data for Wi-Fi fingerprints through user address data comparison between Wi-Fi fingerprints without linking collection time data to Wi-Fi fingerprints.

First, the method for estimating collection position by linking time data for Wi-Fi signal collection to the Wi-Fi fingerprints collected by the mobile terminals (100) is explained below.

As mentioned before, to estimate positions of the points at which Wi-Fi fingerprints that the mobile terminals (100) sent were collected, basically, the present invention uses the address (residence, workplace) data DB for mobile terminal (200) users. When a Wi-Fi fingerprint collected at an arbitrary mobile terminal (100) together with the unique data (PIN) of said mobile terminal (200) are input to the Wi-Fi radio map building devices (300, 300-1) through the wireless network (400), using the unique data (PIN) of said mobile terminal (100), the user who carries the corresponding mobile terminal (100) and her address (residence, workplace) are searched at the user address DB, and it is decided that the collected Wi-Fi fingerprint was collected either at the user's residence or the user's workplace. Here, in order to decide where the Wi-Fi fingerprint was collected at one of the residence and the workplace, the time data at which the Wi-Fi fingerprint was collected is used. For example, if the collection time belongs to a time period between midnight and morning, it is decided that the collection was done at the residence (house), and if the time period is between morning and afternoon, it is decided that the collection was done at the workplace (office). In this way, the Wi-Fi fingerprint collection position is decided as one of the workplace or the residence.

Securing time data for figuring out Wi-Fi fingerprint collection time may adopt method that when the mobile terminal (100) collects Wi-Fi fingerprint at pre-determined interval, the identified time data is combined with Wi-Fi fingerprint and they together are transmitted. In another method, when Wi-Fi fingerprint that the mobile terminal transmitted is received, the receiving time data at that time may be combined by the Wi-Fi radio map building devices (300, 300-1). In the case that the Wi-Fi radio map building devices (300, 300-1) combine the time data for the Wi-Fi fingerprints transmitted by the mobile terminals (100), there is a prerequisite that whenever the mobile terminal (100) collects a Wi-Fi fingerprint, the terminal transmits it to the Wi-Fi radio map building devices (300, 300-1) on real time.

As explained above, the present invention can selectively adopt one of the two methods in securing the time data. In case that the mobile terminal (100) combines the Wi-Fi fingerprint to the time data for Wi-Fi fingerprint collection, there is an advantage that the number of transmission operation by the mobile terminal (100) is reduced because the mobile terminal does not transmit every time it collects a Wi-Fi fingerprint but it can transmit in bundle after gathering a predetermined number of them. On the other hand, in case that the Wi-Fi radio map building devices (300, 300-1), which receive Wi-Fi fingerprints, combine the time data for the Wi-Fi fingerprints, there is an advantage that the mobile terminal (100) does not need to do separate signal processing for combining Wi-Fi fingerprint collection time data.

Figure 2:
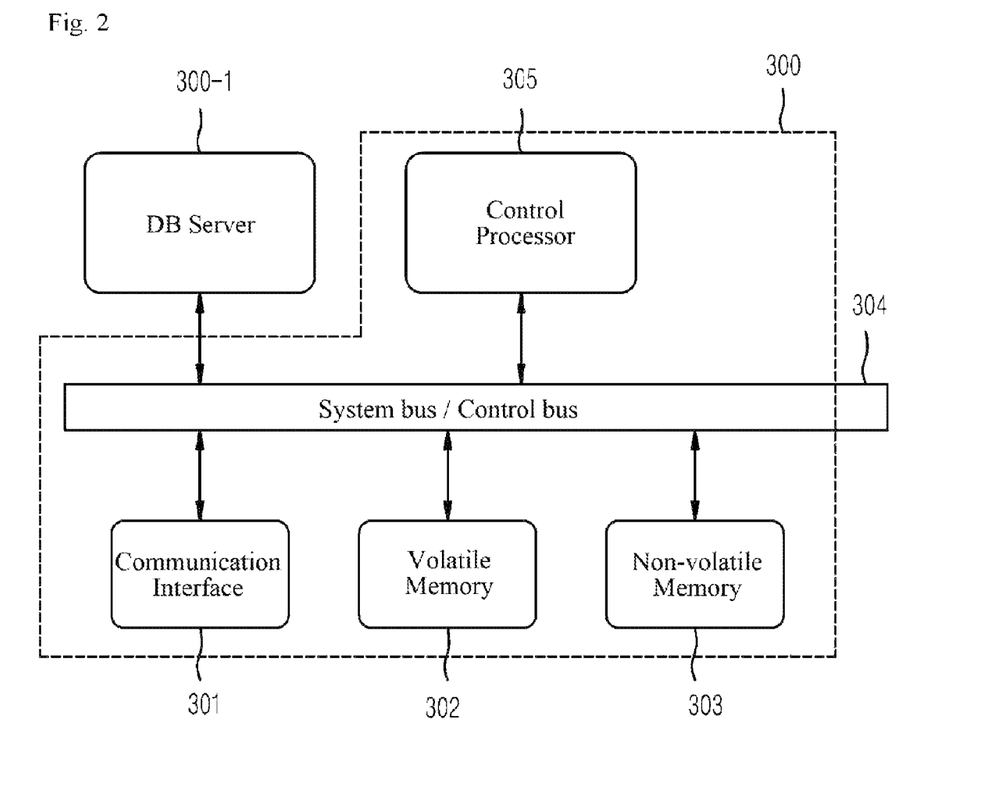
FIG. 2 is a block diagram of a Wi-Fi radio map building device according to the present invention.
Figure 3:
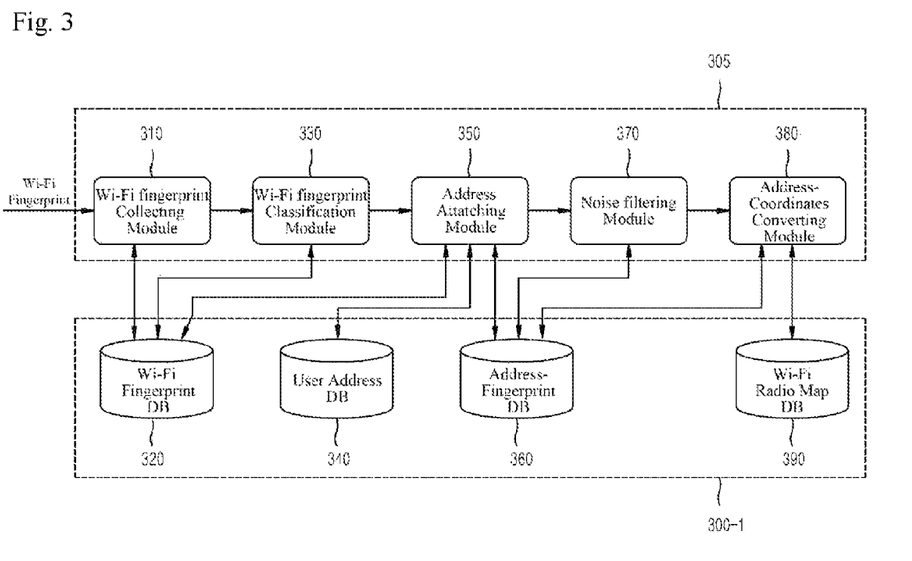
FIG. 3 is an internal structure diagram for a control processor and a database server according to an embodiment of the present invention.
Figure 4:
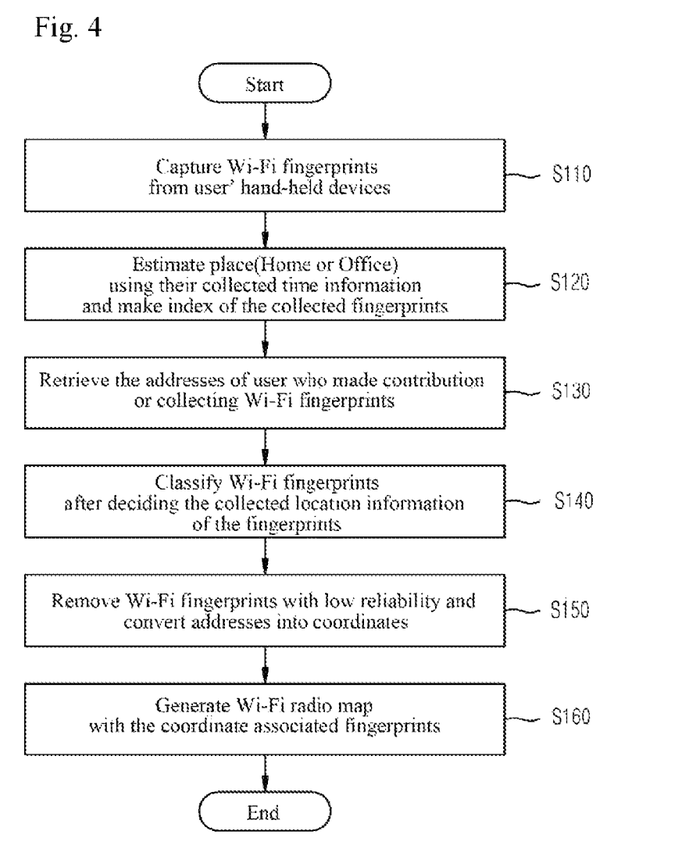
FIG. 4 is a flow diagram of Wi-Fi radio map building method according to an embodiment of the present invention.

The method for estimating collection position for Wi-Fi fingerprints by linking collection time data to the Wi-Fi fingerprints collected by the mobile terminals (100) is explained in detail as an embodiment of the present invention referring FIGS. 2-4.

FIG. 2 is a block diagram a Wi-Fi radio map building device according to an embodiment of the present invention, and FIG. 3 is an internal structure diagram for a control processor of the computation server (300) and a database (DB) server, which implement blocks of FIG. 3 as software modules.

The database (DB) server (300-1) comprises a Wi-Fi fingerprint DB (320) that stores and manages data ("first received data", hereinafter), which includes Wi-Fi fingerprints and the mobile terminal unique data that the mobile terminals (100) transmitted; a user address DB (340) that stores and manages addresses for users who own mobile terminals (100) by classifying them as residence, or workplace, an address-fingerprint DB (360) that stores data that combine the Wi-Fi fingerprint and users' specific address, and a Wi-Fi radio map DB (390) that stores the Wi-Fi radio map that is finally generated with the present invention.

Here, the user address DB (340) stores residence address, workplace address data together with the unique data (PIN) for the mobile terminal carried, per user. In addition, as application of the Wi-Fi radio map building devices (300, 300-1) according to the present invention, when they are installed as specific application in a designated area such as university campus, laboratory and factory, user's detailed activity space address, for example, detailed position indicating data like XX building, yy floor and zz room number may be added to the data of the user address DB.

The computation server (300) includes a control processor (305), a communication network interface (301), a volatile memory (302), and a non-volatile memory (303). Data communications between these servers and among internal functional parts are performed using system/control bus (304).

When the control processor (305) receives the first received data that the plurality of mobile terminals (100) transmitted, it checks whether Wi-Fi fingerprint collection time data is included in said first received data. If there is none, it combines the time data at which the first received data was received to said first received data as Wi-Fi fingerprint collection time data. Then, it finds the corresponding user referring said user address DB (340) using the mobile terminal unique data within said first received data; and using said collection time data, it selects one between user's addresses (residence, workplace), who owns the mobile terminal that transmitted said first received data. Then it combines selected address to the Wi-Fi fingerprint in said first received data, converts the combined user address to coordinates, combines the converted coordinates, and finally generates Wi-Fi radio map data. Here, the finally generated Wi-Fi radio map data is generated as one form among a form combining said Wi-Fi fingerprint and coordinates data, or a form combining the unique data of AP (200) that is contained in the Wi-Fi fingerprint and the coordinates, and stored and managed at the Wi-Fi radio map DB (390).

For this, the control processor (305) includes a Wi-Fi fingerprint receiving part (310), Wi-Fi fingerprint classifying part (330), an address combining part (350), a noise removing part (370), and an address-coordinates converting part (380). All of these can be implemented as software modules. Operations of the internal functioning modules of the control processor (305) are explained in detail below.

When the first received data transmitted from an arbitrary mobile terminal is received, the Wi-Fi fingerprint receiving part (310) decides whether Wi-Fi fingerprint collection time data is combined in the received data. If collection time data is not combined (case that the mobile terminal collected and transmitted Wi-Fi fingerprint on real time), it combines the time data at which said first received data was received. Then it stores the data at the Wi-Fi fingerprint DB (320).

The Wi-Fi fingerprint classifying part (330) is notified with received contents by said Wi-Fi fingerprint receiving part (310), refers to the collection time data combined to said first received data, classifies whether it is Wi-Fi fingerprint collected at the residence (house) of the user, or Wi-Fi fingerprint collected at the workplace (office), and index accordingly.

The address combining part (350) receives classification contents transferred from the Wi-Fi fingerprint classifying part (330), finds user address data through searching the user address DB (340) by using the mobile terminal unique data in said first received data that is stored in the Wi-Fi fingerprint DB (320), specifies an address that corresponds to said classified index, combines it with the Wi-Fi fingerprint in said first received data, and stores it in the address-fingerprint DB (360).

The noise removing part (370) performs a function of removing unreliable Wi-Fi fingerprints among the Wi-Fi fingerprints combined with specific addresses, which are stored in the address-fingerprint DB (360). That is, for Wi-Fi fingerprints combined with address of residence or workplace, it makes a group of Wi-Fi fingerprints combined with the same or similar addresses, checks whether the AP unique data included by an arbitrary Wi-Fi fingerprint that belongs to the group coincide with the AP unique data included by most of the other Wi-Fi fingerprints. In case that a coinciding AP, that is, a common AP data is not included at all, it is decided as an unreliable Wi-Fi fingerprint and removed. The reason is that it is proper to decide that Wi-Fi fingerprints collected at the same or similar locations must have at least one coinciding AP unique data.

When unreliable data in the address-fingerprint DB (360) is cleared by the noise removing part (370), the address-coordinates converting part (380) brings the Wi-Fi fingerprint data in the address-fingerprint DB (360), and performs the function of converting the address that is combined to the Wi-Fi fingerprint into longitude, latitude coordinates. Then it finally generates an Wi-Fi radio map data combined with the converted coordinates, and stores it in the Wi-Fi radio map DB (390). Here, the generation of the Wi-Fi radio map data that the address-coordinates converting part (380) finally generates may be in a form in which said Wi-Fi fingerprint and coordinates are combined, or in a form in which the AP unique data included in said Wi-Fi fingerprint and coordinates are combined.

In addition, the address-coordinates converting part (380) refers to an internally provided address-coordinates DB (not shown in the drawings) to obtain coordinates data, or connects to an external relevant service providing server (for example: Google Geo-coding service server) to obtain coordinates data.

FIG. 4 is a flow diagram showing a method for building Wi-Fi radio map according to an embodiment of the present invention, and illustrates the process performed by the control processor (305) in FIG. 2.

When it receives the first received data that the plurality of mobile terminals (100) transmitted, it decides whether Wi-Fi fingerprint collection time data is combined to the first received data that it received, and in case that it is not combined, it combines the time data at which said first received data was received as the collection time data of the Wi-Fi fingerprint. Then, it estimates the location at which the Wi-Fi fingerprint was collected referring said collection time data, and classifies and indexes per location type (S110, S120). For example, if the time indicated by the collection time data is a time period between night and morning, it is presumed that the Wi-Fi fingerprint was collected when the user carrying the corresponding mobile terminal (100) was staying at residence (house), and if it is a time period between morning and afternoon, it is presumed that the collection was done when he was staying at workplace (office). Then it estimates the position, at which the Wi-Fi fingerprint in said first received data that was transmitted by the mobile terminal was collected, as either of residence address or workplace address of the mobile terminal user, and indexes it.

Next, it finds the corresponding user that is stored in the user address DB (340) using the mobile terminal unique data in said first received data, brings an address that corresponds to the indexed location type (residence or workplace) among the addresses of thus found user, combines it with the Wi-Fi fingerprint in said first received data, and classifies it per the combined address (S130, S140).

The Wi-Fi fingerprint combined with specific address is kept or removed through a reliability test. After comparison with other Wi-Fi fingerprints to which the same or similar address is combined, it is decided whether the same AP unique data is included or not, then it is kept or disposed. Then, for Wi-Fi fingerprints that were kept through the reliability test, it converts the combined specific address into longitude latitude coordinates data (S150).

After converting into coordinates, a Wi-Fi radio map data is generated as either a form in which said Wi-Fi fingerprint and coordinate data are combined, or a form in which the AP unique data included in the Wi-Fi fingerprint and coordinates are combined, then it is stored and managed in the Wi-Fi radio map DB (390) (S160).

On the other hand, the present invention provides a method that estimates the position at which a Wi-Fi fingerprint was collected without linking collection time data to the Wi-Fi fingerprint that a mobile terminal (100) collected. This method is explained briefly below.

When the Wi-Fi radio map building devices (300, 300-1) receives data including mobile terminal unique data and Wi-Fi fingerprint ("second received data" hereinafter) from an arbitrary mobile terminal (100), they find the user using the mobile terminal unique data in said second received data that was received, then combine thus found user's address for both residence and workplace to said received data, and stores it in DB. Then, they check, among the previously received data that is combined with user address data and stored, whether there is a data that has the same AP unique data even though the mobile terminal unique data is not the same as that of said second received data. If an existing data including the same AP unique data is checked, the user address data combined to said second received data that was received is compared to the user address data combined to the checked existing data. As far as they include the same AP unique data, upon comparison of address data, it must show adjacent relation on either residence or workplace address.

That is, let's say the currently received second received data, 'Data A,' and among the data that were received earlier than Data A and stored in DB, the data including the same AP unique data as the AP unique data included in Data A, 'Data B,' then the similarity of addresses combined to them is illustrated as one of the following 4 cases (case 1~case 4).

TABLE 1

(case 1)

| | Data A | | Data B |
|---|---|---|---|
| Residence address | aa city, bb ku, cc dong, 1 | Residence address | aa city, bb ku, cc dong, 2 |
| Workplace address | xx city, yy ku, zz dong, 3 | Workplace address | jj city, ii ku, kk dong, 10 |

TABLE 2

(case 2)

| | Data A | | Data B |
|---|---|---|---|
| Residence address | aa city, bb ku, cc dong, 1 | Residence address | mm city, nn ku, oo dong, 12 |
| Workplace address | xx city, yy ku, zz dong, 3 | Workplace address | xx city, yy ku, zz dong, 4 |

TABLE 3

(case 3)

| | Data A | | Data B |
|---|---|---|---|
| Residence address | aa city, bb ku, cc dong, 1 | Residence address | xx city, yy ku, zz dong, 4 |

TABLE 3-continued (case 3)

| | Data A | | Data B |
|---|---|---|---|
| Workplace address | xx city, yy ku, zz dong, 3 | Workplace address | mm city, nn ku, oo dong, 12 |

TABLE 4

(case 4)

| | Data A | | Data B |
|---|---|---|---|
| Residence address | aa city, bb ku, cc dong, 1 | Residence address | mm city, nn ku, oo dong, 12 |
| Workplace address | xx city, yy ku, zz dong, 3 | Workplace address | aa city, bb ku, cc dong, 2 |

Like this, after classifying Wi-Fi fingerprints collected from different mobile terminals (100) into fingerprints collected from house or workplace respectively and arbitrarily (at this stage, specifying house or workplace may include errors.), when the classified groups of fingerprints are compared with each other, if they include the same AP unique data, at least one of the residence address and workplace address of the users who own these mobile terminals (100) has mutually adjacent relationship. Then the collection location of the Wi-Fi fingerprint may be estimated an address having adjacent relationship with one of the addresses combined to existing Wi-Fi fingerprints that were collected.

When the collection position of the received Wi-Fi fingerprint is estimated as a specific address by this process, process afterward is the same as the process in the abovementioned method that links the time data.

Figure 5:
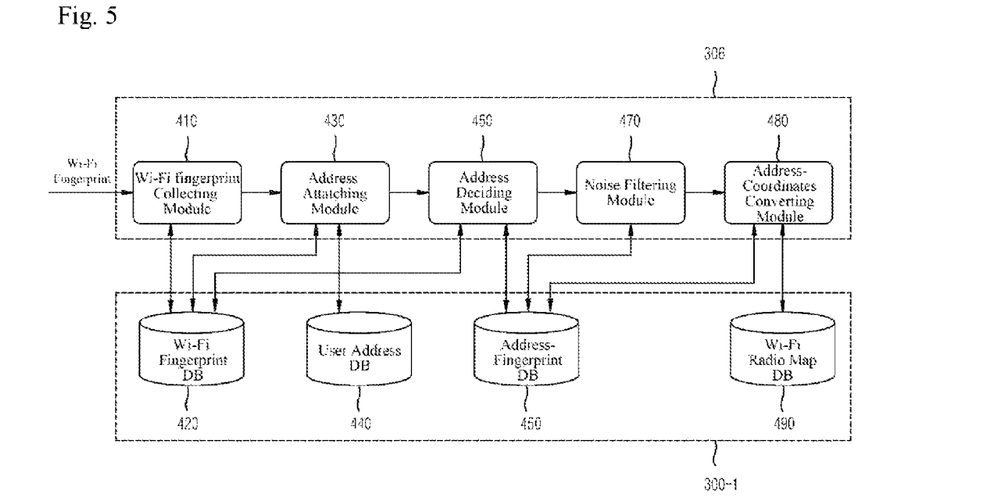
FIG. 5 is an internal structure diagram for a control processor and a database server according to another embodiment of the present invention.
Figure 6:
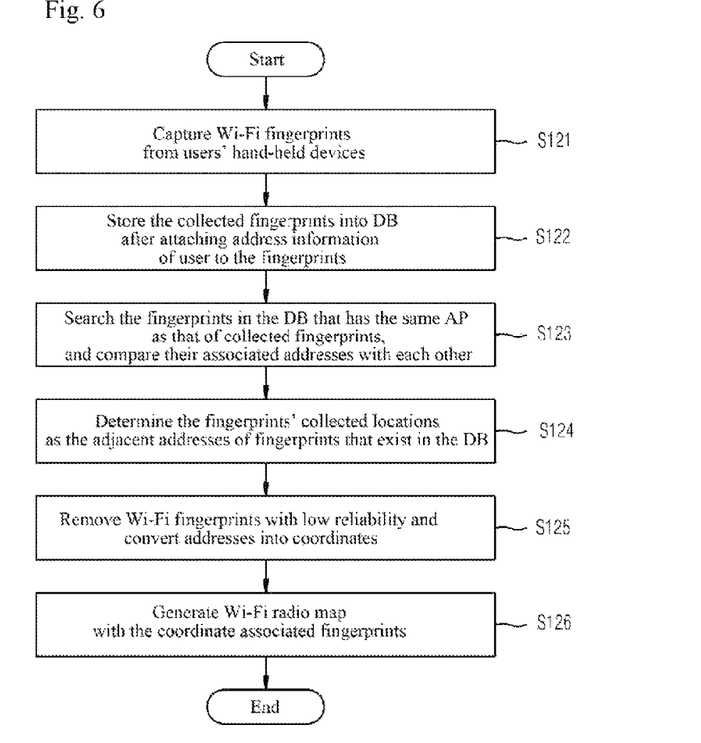
FIG. 6 is a flow diagram of Wi-Fi radio map building method according to another embodiment of the present invention.

The method that estimates collection position of Wi-Fi fingerprint for Wi-Fi fingerprints collected by mobile terminals (100) by comparison with address data combined to existing received Wi-Fi fingerprints and without linking to collection time data as the above is explained in detail as another embodiment of the present invention referring FIG. 5 and FIG. 6.

FIG. 5 is an internal structure diagram for a control processor of a computation server and a database server according to another embodiment of the present invention, which implement blocks of FIG. 5 as software modules.

In another embodiment of the present invention, a control processor (306) includes an Wi-Fi fingerprint receiving part (410), an address combining part (430), an address decision part (450), a noise removing part (470) and an address-coordinates converting part (480). All of these can also be implemented as software modules. Since the noise removing part (470) and the address-coordinates converting part (480) differ only in reference numeral, and their construction and operation are the same as in the first embodiment of the present invention, detailed explanation is omitted.

The Wi-Fi fingerprint receiving part (410) is in charge of the function of receiving the second received data transmitted by a plurality of mobile terminals (100) and storing them in the Wi-Fi fingerprint DB (420).

The address combining part (430) is notified the received contents from said Wi-Fi fingerprint receiving part (410), retrieves all address data of the user for the corresponding mobile terminal (100) from the use address DB (440) using the mobile terminal unique data included in said second received data, and combines them to said second received data that is stored in the Wi-Fi fingerprint DB (420).

The address decision part (450) receives contents combined with user addresses delivered from the address combining part (430), and searches whether there is an existing data that includes AP unique data which is the same as that of said second received data. That is, it compares the existing data stored in the Wi-Fi fingerprint DB (420) and the contents included the second received data that is currently received, and searches if there is one in which the mobile unique data do not coincide but the AP unique data are the same.

As result of searching, if data meeting the conditions is searched, then the addresses combined to the searched existing data and said second received data are compared with each other, and the address among those combined to said second received data, which is in adjacent relationship with one of the addresses combined to the existing data is estimated as the position that the Wi-Fi fingerprint in the second received data was collected. And new data that combines only the Wi-Fi fingerprint in the second received data and the address estimated as the collection position is generated, and stored in the address-fingerprint DB (450).

If as result of the above searching, no data meeting the conditions is searched, the second received data is kept stored in the Wi-Fi fingerprint DB (420) to use as comparison object with data that will be received in the future.

After then, the noise removing part (470) performs reliability test for the Wi-Fi fingerprints combined with specific address and stored in the address-fingerprint DB (450); the Wi-Fi radio map data combined with the coordinates data is generated by the address-coordinates converting part (480), and stored in the Wi-Fi radio map DB (490). The Wi-Fi radio map data that said address-coordinates converting part (380) finally generates can of course be generated in the form in which said Wi-Fi fingerprint and coordinates are combined, or in the form in which the AP unique data included in said Wi-Fi fingerprint and the coordinates.

Here, the noise removing part (470) is an optional element that may be or may not be included as an element of the control processor.

FIG. 6 is a flow diagram of the method for building Wi-Fi radio map according to another embodiment of the present invention. It illustrates the process performed by the control processor (306) of FIG. 5.

When the second received data, which the plurality of mobile terminals transmitted, is received, it extracts the address of the residence, workplace of the user who owns said mobile terminal (100) from the user address DB (422) using the mobile terminal unique data included in said second receiving data, combines it with said second received data, and stores it in the Wi-Fi fingerprint DB (420) (S121, S122).

And among the data already stored, it searches whether there is a data that includes the same AP unique data even though the mobile terminal unique data is different compared to said second received data. If there is data that includes AP unique data which is the same as that of said second received data, users' addresses combined respectively to corresponding existing data and to said received data are compared, and among the addresses combined to said second received data, whether there is one having adjacent relationship with any of user address data of existing data is decided (S123). When it is decided which is the address having the adjacent relationship, the decided address is estimated the position at which the Wi-Fi fingerprint included in the second received data was collected. Then, the Wi-Fi fingerprint in the second received data combined only with said decided address is generated as new data and stored in the address-fingerprint DB (450) (S124).

The Wi-Fi fingerprints combined with specific addresses and stored in the address-fingerprint DB (450) are enhanced in reliability through noise removal, and said specific addresses are converted into coordinates. And, Wi-Fi radio map data are generated either in the form in which said Wi-Fi fingerprint and said coordinates are combined, or in the form in which the coordinates and the AP unique data included in the Wi-Fi fingerprints are combined, and stored and managed in the Wi-Fi radio map DB (390) (S160).

It should be understood that the embodiments explained above are only explanation of preferred embodiments of the present invention; the scope of right for the present invention is not limited to the explained embodiments; various changes, transformations or substitutions are possible by those are skilled in the art to which the present invention pertains within technical constitution of the present invention and patent claims; and such embodiments belong to the scope of the present invention.

INDUSTRIAL APPLICABILITY

The present invention described above can be applied to implementing position data providing system based on Wi-Fi signal by building Wi-Fi radio map for cities worldwide. In addition, it can be utilized for purpose that a specific company or organization builds Wi-Fi radio map for a building belonging to it, and uses the map for checking current positions of people, and therefore can be utilized in implementation of a work status monitoring system or safety management system for a company or organization, and a response system against disaster.

The invention claimed is:

1. A Wi-Fi radio map building apparatus comprising:
a user address database that stores address data for a plurality of users who carry mobile terminals; and
a control processor that receives Wi-Fi fingerprints collected and transmitted by the mobile terminals that said plurality of users carry; refers to said user address database for each received Wi-Fi fingerprint; selects one among addresses of the user who carries the mobile terminal that collected the Wi-Fi fingerprint; converts the selected user address to coordinates; and the generates Wi-Fi radio map data;
wherein said control processor comprises:
a Wi-Fi fingerprint receiving part that decides whether time data for collection time is combined for each of the Wi-Fi fingerprints that the mobile terminals carried by said plurality of users collected and transmitted; and when no time data is combined, combines time data of the time that the corresponding Wi-Fi fingerprint was received;
a Wi-Fi fingerprint classifying part that is notified of received contents from said Wi-Fi fingerprint receiving part; refers to said combined time data; and classifies type of the location at which the corresponding Wi-Fi fingerprint was collected;
an address combining part that is notified of the location type classification contents from said Wi-Fi fingerprint classifying part; retrieves data for user who carried the mobile terminal that transmitted the Wi-Fi fingerprint and the user's address through referring to said user address database; among the user's addresses retrieved, selects an address that corresponds to said classified location type; and combines it with said Wi-Fi fingerprint; and
an address-coordinates converting part that converts the address selected by said address combining part into coordinates; and generates Wi-Fi radio map data combined with the converted coordinates.

2. The Wi-Fi radio map building apparatus of claim 1, wherein said address-coordinates converting part generates the Wi-Fi radio map data in a state in which said converted coordinates and the Wi-Fi fingerprints are combined.

3. The Wi-Fi radio map building apparatus of claim 1, wherein said address-coordinates converting part generates the Wi-Fi radio map data in a state in which Wi-fi repeater unique data included in said Wi-Fi fingerprint and the coordinates are combined.

4. The Wi-Fi radio map building apparatus of claim 1, wherein said Wi-Fi fingerprint classifying part classifies type of location, at which the Wi-Fi finger print was collected, as residence or workplace.

5. The Wi-Fi radio map building apparatus of claim 1, the Wi-Fi radio map building apparatus of claim 2, further comprising a noise removing part that, for Wi-Fi fingerprints combined with addresses at said address combining part, removes Wi-Fi fingerprints that were decided unreliable through comparison with other Wi-Fi fingerprints combined with the same or similar addresses.

6. The Wi-Fi radio map building apparatus of claim 1, wherein said control processor comprises:
a Wi-Fi fingerprint receiving part that receives Wi-Fi fingerprints that the mobile terminals carried by said plurality of users collected and transmitted;
an address combining part that is notified of received contents from said Wi-Fi fingerprint receiving part; retrieves the user that carries the mobile terminal that transmitted said received Wi-Fi fingerprint and address data of said user from the user address database; and combines them to said received Wi-Fi fingerprint;
an address decision part that searches existing received Wi-Fi fingerprint that includes the same AP unique data as that of said received Wi-Fi fingerprint; and decides an address that is estimated as the position at which said received Wi-Fi finqerprint was collected, through checking adjacent relationship between user addresses combined to said received Wi-Fi fingerprint by said address combining part and user addresses combined to the searched existing Wi-Fi fingerprint; and
an address-coordinates converting part that converts the address decided by said address decision part into coordinates; and generates Wi-Fi radio map data combined with said converted coordinates.

7. A Wi-Fi radio map building method, wherein a user address database stores address data for a plurality of users who carry mobile terminals, and wherein a control processor receives Wi-Fi fingerprints collected and transmitted by the mobile terminals that said plurality of users carry; refers to said user address database for each received Wi-Fi fingerprint; selects one among addresses of the user who carries the mobile terminal that collected the Wi-Fi fingerprint; converts the selected user address to coordinates; and then generates Wi-Fi radio map data; the method comprising:
a first step of Wi-Fi fingerprint receiving, in which when the Wi-Fi fingerprint transmitted by one of the mobile terminals is received, whether time data for collection time is combined for each of the Wi-Fi fingerprints that the mobile terminals carried by said plurality of users collected and transmitted is decided; and when no time data is combined, time data of the time that the corresponding Wi-Fi fingerprint was received is combined;

a second step of Wi-Fi fingerprint classifying, in which received contents from the first step is notified; said combined time data is referred to; and type of the location at which the corresponding Wi-Fi fingerprint was collected is classified;

a third step of address combining, in which the location type classification contents from the second step is notified; data for user who carried the mobile terminal that transmitted the Wi-Fi fingerprint and the user's address through referring to said user address database are retrieved; among the user's addresses retrieved, an address that corresponds to said classified location type is selected and combined with said Wi-Fi fingerprint; and a fourth step of address-coordinates converting, in which the address selected in the third step is converted into coordinates; and Wi-Fi radio map data combined with the converted coordinates is generated.

8. The Wi-Fi radio map building method of claim 7, wherein the location type classification in said second step is classified into residence or workplace.

9. The Wi-F1 radio map building method of claim 7, further comprisinq, after performinq said third step, a step of removing Wi-Fi fingerprint which is judged unreliable through comparison with other Wi-fi fingerprints to which the same or similar addresses are combined, for the Wi-Fi fingerprints for which addresses are decided.

10. The Wi-Fi radio map building method of claim 7, wherein in the generation of Wi-Fi radio map data in said fourth step, the Wi-Fi radio map data is generated either in a form in which said Wi-Fi fingerprint and said coordinates are combined, or in a form in which Wi-Fi repeater unique data included in the Wi-Fi fingerprint and coordinates are combined.

11. A Wi-Fi radio map building method, wherein a user address database stores address data for a plurality of users who carry mobile terminals, wherein a Wi-Fi fingerprint database stores mobile terminal unique data and Wi-Fi fingerprint, and wherein a control processor receives Wi-Fi fingerprints collected and transmitted by the mobile terminals that said plurality of users carry; refers to said user address database for each received Wi-Fi fingerprint; selects one among addresses of the user who carries the mobile terminal that collected the Wi-Fi fingerprint; converts the selected user address to coordinates; and then generates Wi-Fi radio map data; the method comprising:

a first step of Wi-Fi fingerprint receiving, in which mobile terminal unique data and Wi-Fi fingerprints transmitted by the plurality of mobile terminals are received and stored in the Wi-Fi fingerprint database;

a second step of address combining, in which all address data of the user for a corresponding mobile terminal from the use address database is retrieved using the mobile terminal unique data in the first step, and the address data of the user for the corresponding mobile terminal is combined to said mobile terminal unique data and Wi-Fi fingerprints that are stored in the Wi-Fi fingerprint database;

a third step of address decision, in which existing data stored in the Wi-Fi fingerprint database and said received mobile terminal unique data and Wi-Fi fingerprints are compared, wherein whether there is one in which the mobile unique data do not coincide but the Wi-Fi repeater unique data are the same is searched, wherein if there is one, the addresses combined to the searched existing data and said received mobile terminal unique data and Wi-Fi fingerprints are compared with each other, wherein the address among the addresses combined to said received mobile terminal unique data and Wi-Fi fingerprints, which is in adjacent relationship with one of the addresses combined to the searched existing data is decided as the position at which the Wi-Fi fingerprint in the received mobile terminal unique data and Wi-Fi fingerprints was collected; and a fourth step of generating Wi-Fi radio map, in which said decided address in the third step is converted into coordinates; and Wi-Fi radio map data combined with the converted coordinates is generated.

12. The Wi-Fi radio map building method of claim 11, wherein in the Wi-Fi radio map data generation in said fourth step, Wi-Fi radio map data is generated either in a form in which said received Wi-Fi fingerprint and said coordinates are combined, or in a form in which AP unique data included in Wi-Fi fingerprint and said coordinates are combined.

* * * * *